Figure 1:
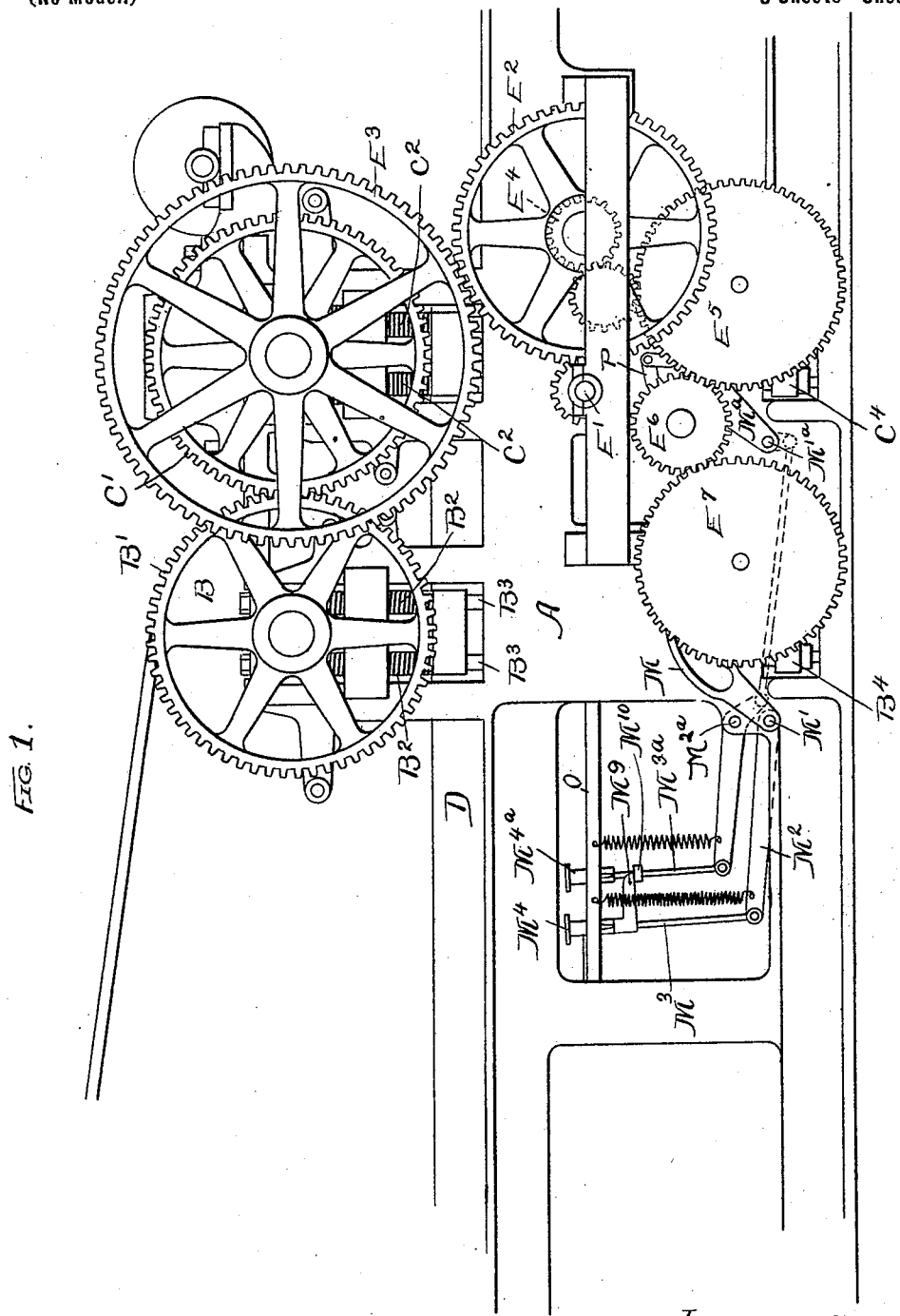

No. 689,505. Patented Dec. 24, 1901.
R. MIEHLE.
TRIPPING MECHANISM FOR PERFECTING PRESSES.
(Application filed Feb. 23, 1899.)
(No Model.) 5 Sheets—Sheet 1.

WITNESSES:

INVENTOR:
ROBERT MIEHLE
BY Munday, Evarts & Adcock
HIS ATTORNEYS

No. 689,505.  
Patented Dec. 24, 1901.
R. MIEHLE.
TRIPPING MECHANISM FOR PERFECTING PRESSES.
(Application filed Feb. 23, 1899.)
(No Model.)
5 Sheets—Sheet 2.
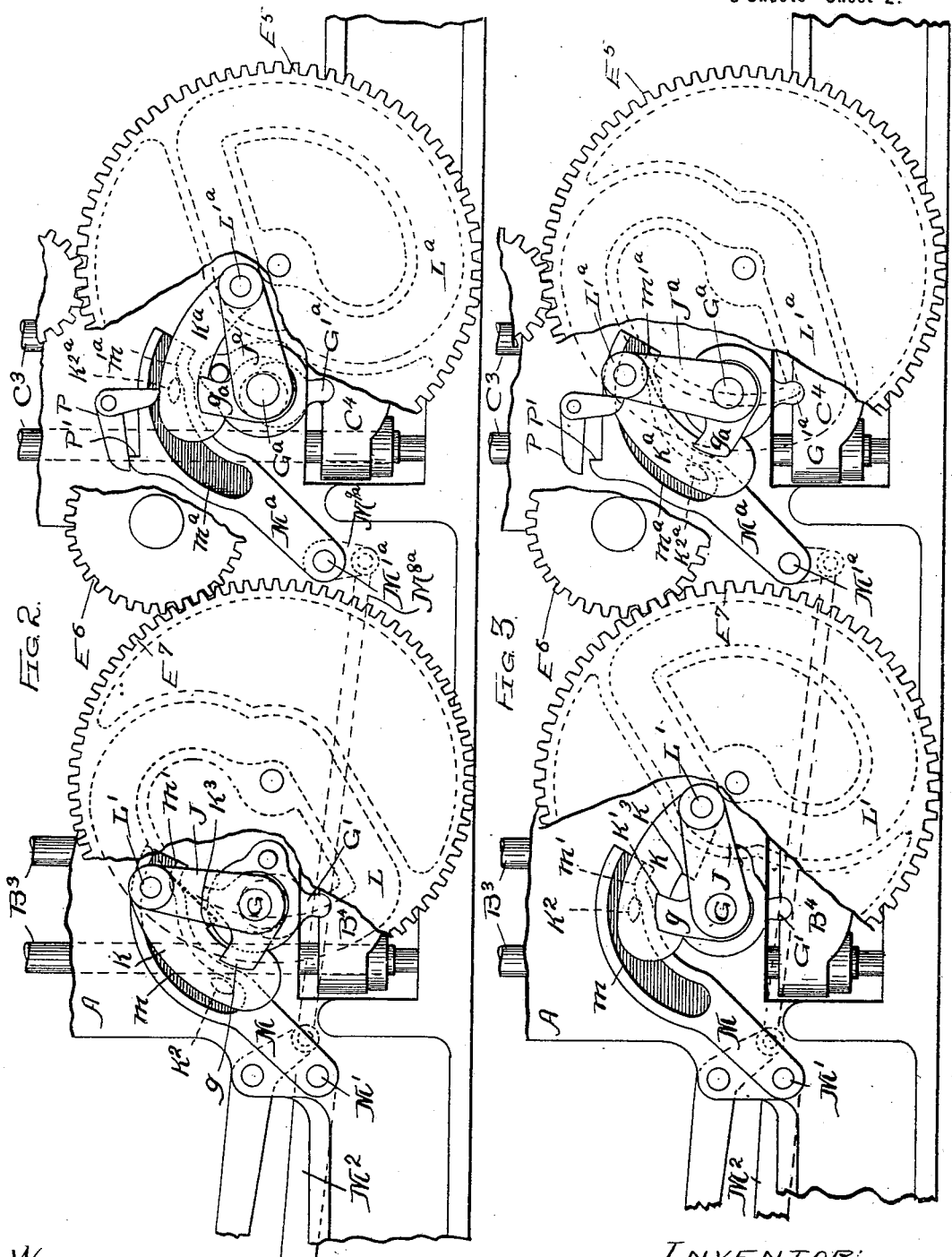
WITNESSES:
INVENTOR:
ROBERT MIEHLE
BY Munday, Evarts & Adcock
HIS ATTORNEYS.

No. 689,505. Patented Dec. 24, 1901.
R. MIEHLE.
TRIPPING MECHANISM FOR PERFECTING PRESSES.
(Application filed Feb. 23, 1899.)
(No Model.) 5 Sheets—Sheet 3.

WITNESSES:
Sew. E. Curtis
H. W. Munday

INVENTOR:
ROBERT MIEHLE
BY Munday, Evarts & Adcock
HIS ATTORNEYS.

No. 689,505. Patented Dec. 24, 1901.
R. MIEHLE.
TRIPPING MECHANISM FOR PERFECTING PRESSES.
(Application filed Feb. 23, 1899.)

(No Model.) 5 Sheets—Sheet 4.

WITNESSES:

INVENTOR:
ROBERT MIEHLE
BY Munday, Evarts & Adcock
HIS ATTORNEYS.

No. 689,505. Patented Dec. 24, 1901.
R. MIEHLE.
TRIPPING MECHANISM FOR PERFECTING PRESSES.
(Application filed Feb. 23, 1899.)
(No Model.) 5 Sheets—Sheet 5.
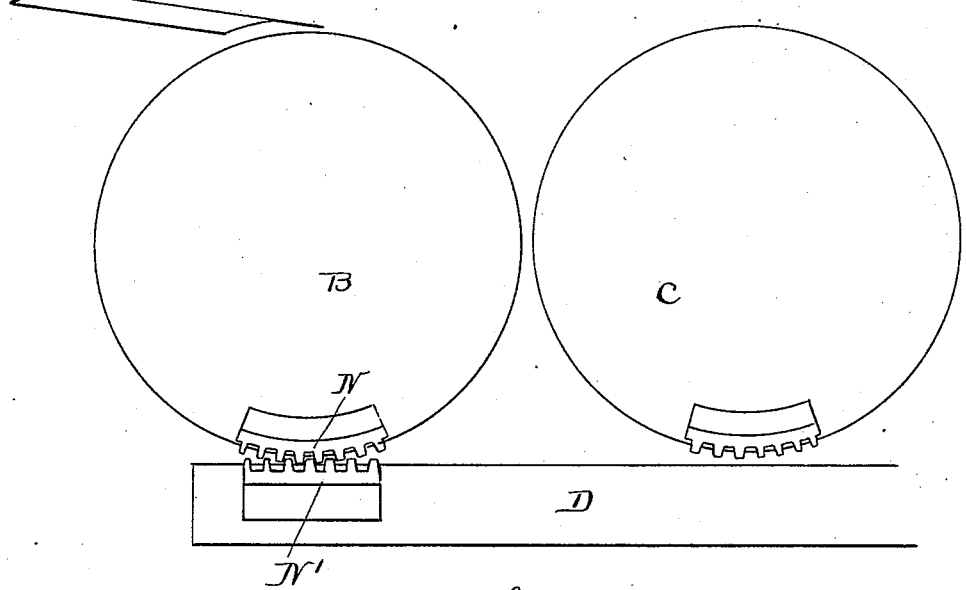
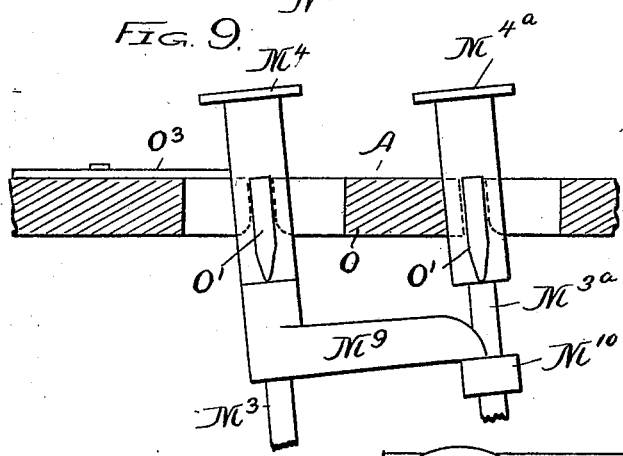
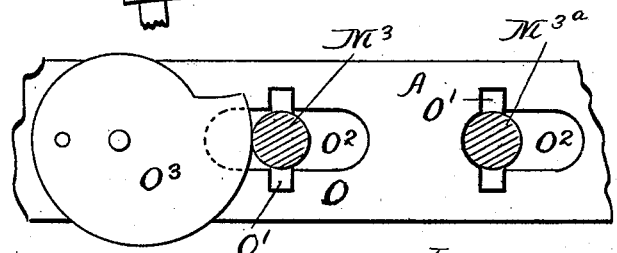
WITNESSES:
Lew. E. Curtis
H. W. Munday
INVENTOR:
ROBERT MIEHLE
BY Munday, Evarts & Adcock,
HIS ATTORNEYS.

UNITED STATES PATENT OFFICE.

ROBERT MIEHLE, OF CHICAGO, ILLINOIS, ASSIGNOR TO THE MIEHLE PRINTING PRESS AND MANUFACTURING COMPANY, OF CHICAGO, ILLINOIS, A CORPORATION OF ILLINOIS.

TRIPPING MECHANISM FOR PERFECTING-PRESSES.

SPECIFICATION forming part of Letters Patent No. 689,505, dated December 24, 1901.

Application filed February 23, 1899. Serial No. 706,567. (No model.)

*To all whom it may concern:*

Be it known that I, ROBERT MIEHLE, a citizen of the United States, residing in Chicago, in the county of Cook and State of Illinois, have invented a new and useful Improvement in Tripping Mechanism for Perfecting-Presses, of which the following is a specification.

This invention relates to improvements in double-cylinder printing-presses, and has been devised more especially for use on what are generally termed "two-revolution perfecting-presses."

One object which I have had in view in the invention has been to adapt the tripping mechanism of my Patents No. 550,992, of December 10, 1895, and No. 611,923, of October 4, 1898, to use on double-cylinder presses.

Another object has been to make the two tripping mechanisms, each of which is complete in itself and controls one of the cylinders, independent of each other, so that either may be thrown into action without affecting the other in any way; also, to so construct the two mechanisms as to permit of the two being operated together by the use of one foot; also, to provide means for coupling the mechanisms together normally, so that the operating of one will cause the operating of the other, said coupling, however, being readily releasable and interfering at no time with the independent operation of one of the mechanisms.

A still further object has been to avoid the injurious contact between the intermeshing racks and segments carried by the bed and cylinder which occurs in the presses as now constructed while the cylinder is tripped and during the non-printing movements in the same direction of the bed and cylinder.

The invention consists in the novel construction and combinations of parts and devices hereinafter set forth and will be fully understood from the description given below and the accompanying drawings, in which latter—

Figures 4, 5:
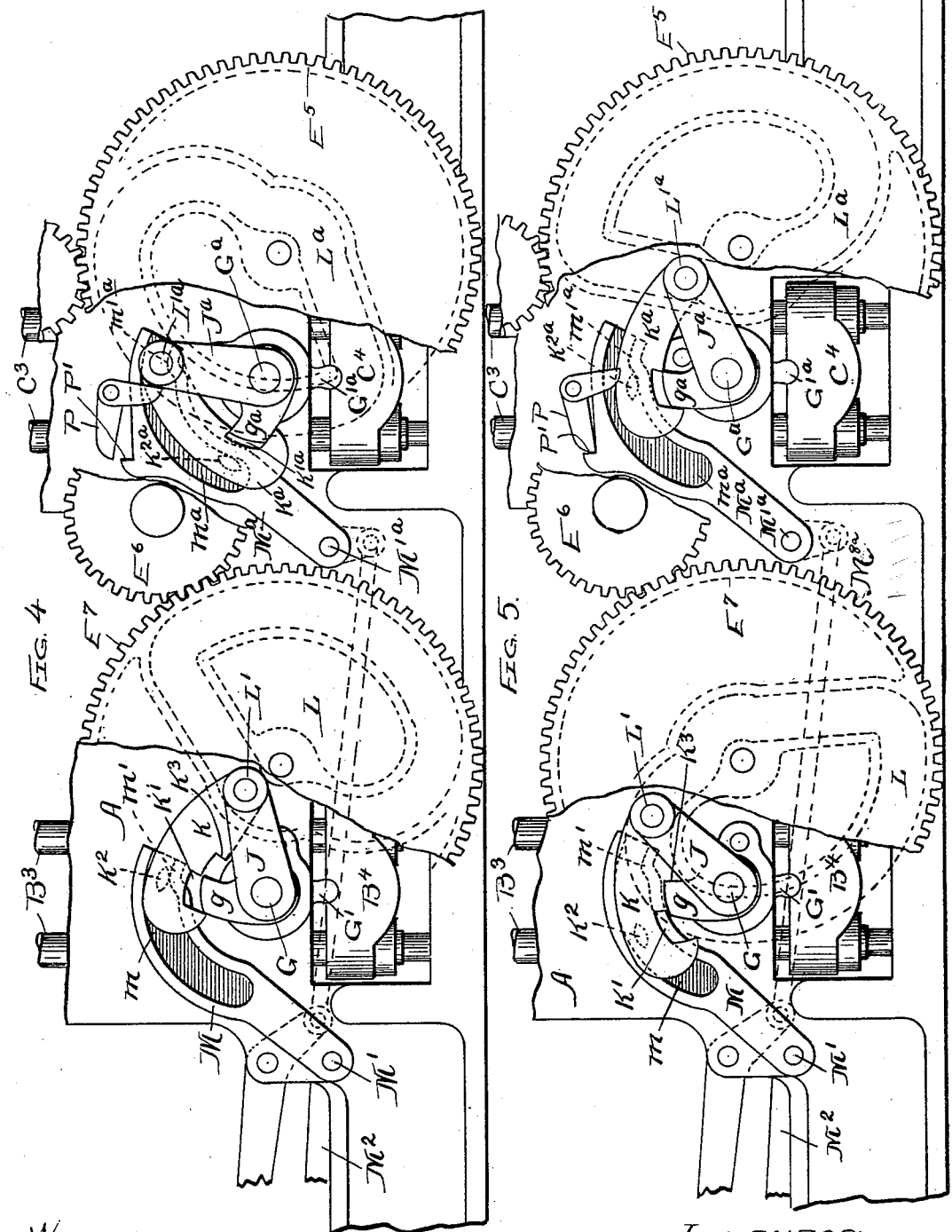
Figure 6:
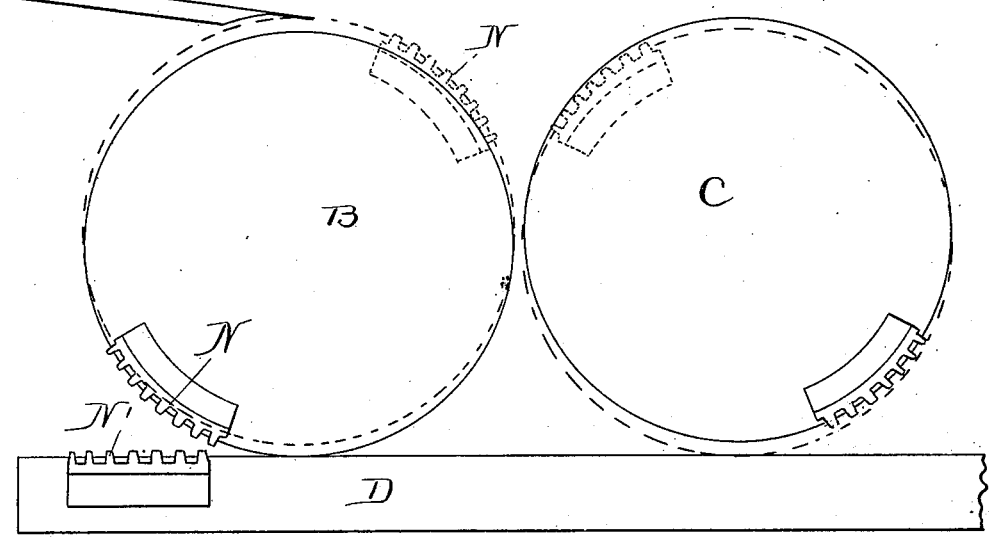
Figure 7:
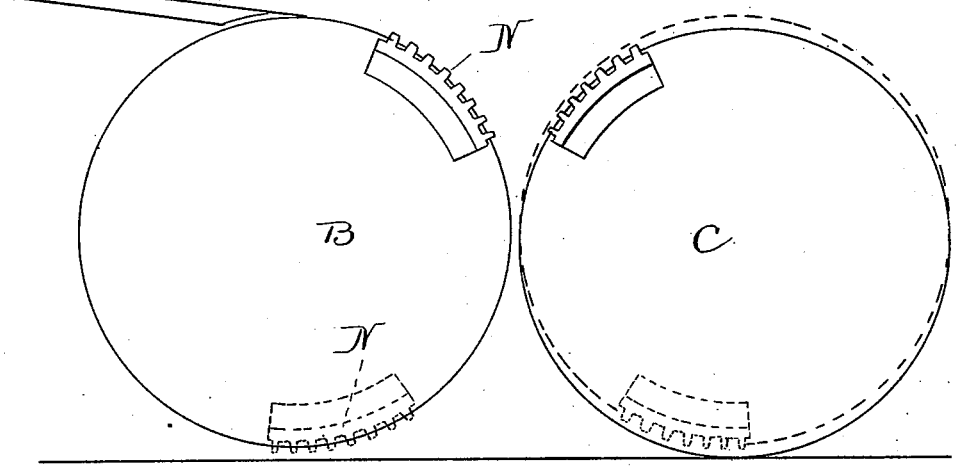

Figure 1 is a side elevation of a two-revolution perfecting-press to which my improvement has been applied. Figs. 2 and 3 are side elevations of that part of the press to which my invention relates, the trip being in a condition of rest. Figs. 4 and 5 are views similar to Figs. 2 and 3, showing the positions occupied by the parts with the trip in action. Figs. 6, 7, and 8 are diagram views showing the various positions of the impression-cylinders, and Figs. 9 and 10 are detail views of the foot-treadles.

As shown in the drawings, A represents the frame of the machine; B, the first cylinder; C, the second cylinder; B' and C', the intermeshing gears upon the cylinder-shafts, and D the reciprocating type-bed.

$B^2$ $B^2$ are the springs for lifting cylinder B, and $C^2$ $C^2$ the springs for lifting cylinder C. The rods $B^3$ $B^3$, connected by a cross-head $B^4$, serve as the means for depressing the cylinder B, and the rods $C^3$ $C^3$ and cross-head $C^4$ serve the same function with cylinder C. The cross-heads are operated by eccentrics on the rock-shafts G and $G^a$, hereinafter mentioned, such eccentrics being connected to the cross-heads by oscillating blocks G' and $G'^a$, like that of Patent No. 611,923.

E' is the main drive-shaft, and it carries a pinion engaging a gear $E^2$, meshing with a gear $E^3$ on the shaft of cylinder C, thus actuating both cylinders, and through a pinion $E^4$ said shaft gives motion to a chain of gears $E^5$, $E^6$, and $E^7$, whereby the driven parts of the tripping mechanism are actuated, as will be understood later on.

A separate tripping mechanism is shown in connection with each cylinder, and these mechanisms are adapted to be used together, so as to control both cylinders at the same time, or they may be used independently to keep either cylinder out of acting position during the adjustment of the other. The tripping mechanisms are both nearly the same as that shown in my said patents; but to avoid confusion I will describe them separately.

In the mechanism pertaining to cylinder B the eccentric-shaft through which the cross-head $B^4$ is depressed for the purpose of bringing that cylinder down to its printing-level is shown at G, and the oscillating block through which the eccentric actuates the cross-head is shown at G'. The shaft G is rocked through the medium of the arm $g$, projecting from it at one end, the dog K engaging said arm at the notch K' in the dog, the arm J loose upon the shaft, but pivotally joined at its outer end to one end of the dog, and a constantly-rotating cam-wheel L, actuated by the gear E⁷, the groove of said wheel engaging the projecting end of the pin L', whereby the arm J and the dog are united, this cam furnishing the power whereby the shaft G is rocked. The arm $g$ and dog are normally in engagement, as shown at Figs. 2 and 3, and they cause the lowering of cylinder B at proper intervals; but this normal engagement may be broken at any time—as, for instance, when no paper is fed by the attendant—through the medium of the lever M, pivoted at M' and actuated by the foot-lever M², vertical rod M³, and footpiece M⁴, the latter being within easy access by the attendant who may be feeding the press. The depressing of the foot-lever throws the farther end of lever M upward, and this end is provided with a side recess $m$, curved for the major part of its length concentric with the axis of the shaft G; but its under side has a cam portion $m'$, as shown in broken lines at Figs. 2 and 3. Into this groove or recess a pin K², projecting laterally from the dog K, enters, and during the normal operation of the machine such pin rides idly in the concentric portion of the recess; but when the lever M is operated, as mentioned the cam portion $m'$ of the recess acts on pin K² and lifts the dog, as seen at Fig. 4, and destroys the engagement between the notch K' in the latter and the shaft-arm $g$, so that said arm will now in the further movement of the dog, received from the cam-wheel, encounter a shoulder K³, also formed on the under side of the dog, but nearer its attachment to the arm J than the notch K'. This engagement with the shoulder K³ results in a modified rocking motion by the eccentric-shaft G and one which by reason of the changed position of the parts controlling said shaft causes the same to depress the cylinder B to a less extent than usual and to a position intermediate of its normal non-acting or raised position and its normal depressed or printing position. My object in causing this modified or shortened throw by the eccentrics when the cylinder is tripped is as follows: Cylinder B is provided with a toothed segment N, such as is usually provided to keep the cylinders in register with the bed, the latter being provided with a short rack, such as N', meshing with the segment N. In presses as heretofore constructed the segment and rack have been apt to interfere or strike without meshing when the cylinder is tripped, this being due to the fact that the tripped cylinder is not held high enough to prevent the tips of the teeth in the rack and segment from striking. To increase the throw of the eccentrics to wholly avoid such contact is not desirable, because that would increase the vertical movement of the cylinder, and hence I have been led to adopt means for causing the eccentrics to impart the modified or lessened throw above described when the cylinder is tripped in order that the teeth of the segment and rack may be in partial if not complete mesh while the cylinder is tripped and moving with the bed instead of being in a mere rubbing contact at such times. In practice the construction described will cause the cylinder to be lowered about two-thirds of the distance necessary to bring about printing contact, and this can be done safely while the bed and cylinder are moving in the same direction and is sufficient to cause a meshing of the rack and segment adequate to wholly prevent any mere rubbing contact and to avoid the injury to those parts occurring in previous constructions. I am aware that it would be unsafe to bring the bed and cylinder together to the extent stated while they are moving in opposite directions; but during the time this feature of my invention is in operation they are moving together, so that the proximity is not likely to cause injury or actual contact with the type. Of course I do not wish to be limited to means which lower the cylinder two-thirds of the distance it ordinarily moves, as any lowering which will cause a partial meshing of the rack and segment will accomplish the result stated.

The tripping mechanism for controlling cylinder C is very similar in construction to that above described in connection with cylinder B and comprises, in combination with the eccentric-shaft Gᵃ, having an arm $g^a$ and the oscillating block G'ᵃ, a dog Kᵃ, having notch K'ᵃ, an arm Jᵃ loose on the eccentric-shaft and joined at its outer end to the dog, a constantly-rotating cam-wheel Lᵃ, actuated by the gear E⁵, and a pin L'ᵃ, uniting the dog and arm and traversing the groove of said wheel, so that the wheel furnishes the power for rocking the eccentrics, the arm $g^a$ and the dog being normally engaged and the engagement being broken by a lever Mᵃ, pivoted at M'ᵃ and actuated by the foot of the attendant through the medium of the foot-lever M²ᵃ, vertical rod M³ᵃ, and footpiece M⁴ᵃ, said foot-lever being connected to the lever Mᵃ by the rod M⁸ᵃ and crank M⁹ᵃ. Lever Mᵃ is provided with a side recess $m^a$, having a cam portion $m'^a$ and engaging a pin K²ᵃ, attached to the dog Kᵃ. These parts are all like the corresponding parts of the other mechanism, though it will be noticed that the dog Kᵃ has no second shoulder, such as K³ of the dog K, and the cam-wheel Lᵃ is arranged so that it acts alternately in point of time with cam-wheel L. This second tripping mechanism is also provided with a gravitating latch P, engaging the shoulder or projection P' upon the lever Mᵃ when the latter is raised preparatory to tripping. It is shown about ready to effect this engagement in Fig. 4, and when the engagement is once effected it continues until the arm Jᵃ returns from the position of Fig. 5 to that of Fig. 4. While the engagement is in force, the lever Mᵃ cannot return to its normal position, but is compelled to remain in the position in which it will lift the dog from the arm $g^a$ as soon as the pin $K^{2a}$ reaches the cam part $m'^a$ of the recess in the lever. In other words, this latch sets the lever in advance of the tripping operation and in position so it will operate to lift the dog at the proper time. The utility of the latch is greatest when the two tripping mechanisms are coupled together in some such manner as that hereinafter described, so that the attendant when he depresses the footpiece of one mechanism secures the operation of both mechanisms without the necessity of keeping his foot on the footpiece until both mechanisms have operated. In fact, with this latch he need only to retain the pressure on the footpiece until the latch engages the lever. The latch is released by the arm $J^a$, as will be understood from the drawings, the latch having a depending member projecting into the path of said arm. Obviously this latch can be used with the tripping mechanism of a single-cylinder press with advantage.

I prefer to connect the tripping mechanisms so that the operation of both will be caused by the depressing of the footpiece of one of them. This is very conveniently done by connecting the rods $M^3$ and $M^{3a}$ by means of a cross-arm $M^9$ on the former and a stop $M^{10}$ on the latter. Instead, however, of thus yoking the mechanisms together the footpieces of the two mechanisms may be placed so close together as to enable the operator to depress both by the use of one foot only, and the footpieces are shown in the drawings as arranged to permit this.

As it is sometimes desirable to trip one of the cylinders independently of the other and also to retain it tripped for a time—as, for instance, while one of them is being adjusted or made ready and is being cleaned or its covering replaced—I not only make the mechanisms so they may be thrown into action separately, but I provide means for locking the controlling devices in their acting positions. The construction by which I obtain this result will be understood from Figs. 9 and 10. The depending stems of the footpieces $M^4$ and $M^{4a}$ both pass through a platform or guide $O$, and each stem is provided with wings $O'$, as shown. The openings in the guide $O$ are adapted to permit the free vertical movement of the stems and wings through them, and they are each also elongated at one side, as shown at $O^2$. This construction permits the tipping of either rod $M^3$ or $M^{3a}$ after it has been depressed sufficiently to carry the wings of its footpiece below the guide $O$, such tipping causing the stem to move into the elongated portion $O^2$ of the guide-opening and also causing the wings to engage the under surface of the guide, and thus lock the rod in the depressed position. Either tripping mechanism may be thus independently locked and retained in action as long as desired, and both may be locked at the same time; but I prefer to elongate the opening in guide $O$ upon both sides, as shown, of footpiece $M^4$, so as to allow that piece to be tipped either to the right or to the left, according as it is desired to trip one or both cylinders. When tipped to the right, it will be seen that the arm $M^9$ will be caused to bear down on the stop $M^{10}$ on the rod $M^{3a}$, and thus cause the latter to move simultaneously with rod $M^3$ and cause the locking of both cylinders, (see Figs. 1 and 9;) also, that when the footpiece $M^4$ is tipped to the left it will cause arm $M^9$ to move away from stop $M^{10}$, so that rod $M^{3a}$ will be unaffected by the movement of rod $M^3$. A plate $O^3$ is preferably hinged to the guide $O$ to prevent accidental tipping of the rod $M^3$ in one direction, which it does by covering one of the elongations $O^2$.

The evil existing in the case of the first cylinder, and which I have sought to overcome by lowering that cylinder to an intermediate position, is not so apparent in the case of the second cylinder, because of the fact that the driving power is applied to the latter; but if the driving power were applied to the first instead of the second cylinder then the latter cylinder should be lowered to the intermediate position, and hence I do not wish to be limited to the application of that feature in connection with the first cylinder, although it is shown and described as applied thereto. The setting-latch P may also be used with the first cylinder, as well as with the second.

I claim—

1. The combination with the cylinders of a double-cylinder press, of two complete tripping mechanisms, one for each cylinder, a foot-lever for each tripping mechanism, said mechanisms being adapted to be thrown into operation either independently or together, and means for coupling the foot-levers of the two mechanisms together, substantially as specified.

2. The combination with the cylinders of a double-cylinder press, of tripping mechanisms for each cylinder, the foot-treadles of the mechanisms whereby they are thrown into action being coupled together, substantially as specified.

3. The combination with the cylinders of a double-cylinder press, of alternately-acting tripping mechanisms one for each cylinder, such mechanisms each embodying its own cam-wheel and means for setting the same capable of being simultaneously positioned, and one of the tripping mechanisms being provided with means for holding it out of action while the other tripping mechanism is operating, substantially as specified.

4. The combination with the cylinders of a double-cylinder press, of a tripping mechanism for each cylinder, such mechanisms acting alternately when both are operated, means for controlling both said mechanisms adapted to be set simultaneously, and a retaining device operating to hold the controlling means of the second cylinder mechanism in operative position, substantially as specified.

5. The combination with the cylinders of a double-cylinder press, of alternately-acting tripping mechanisms one for each cylinder, levers M and M$^a$ controlling said mechanisms, and a latch P for holding lever M$^a$ in operative position while the mechanism of the other lever is operating, substantially as specified.

6. The combination with the cylinders of a double-cylinder press, of alternately-acting tripping mechanisms one for each cylinder, levers operated by foot-levers and controlling said mechanisms, and means for detaining the controlling-lever of the mechanism of the second cylinder in acting position after the attendant has released the foot-levers and while the mechanism of the first cylinder is operating, substantially as specified.

7. The combination with the cylinder and reciprocating bed having an intermeshing rack and segment, of rocking eccentrics for lowering the cylinder, a dog K operating said eccentrics and producing both full and shortened throws thereof, means for raising the cylinder and means for actuating said dog in either position, substantially as specified.

8. In a printing-press, the combination of mechanism for tripping the cylinder, and a movable controlling-lever adjacent to such mechanism having a cam adapted to modify the action of the tripping mechanism when the lever is in one position; with means for throwing the lever into operative position, means for holding said lever in such position until the desired operation occurs, and means for subsequently releasing said lever and permitting it to assume a non-active position, substantially as described.

9. In a printing-press, the combination of the impression-cylinder, and mechanism for tripping such cylinder, and a movable lever having a cam adapted to modify the operation of said mechanism when the lever is in one position; with a foot-lever and connections for setting such lever in such position that its cam will come into operation, means for locking such lever in such position upon depression of the foot-lever, and means for releasing the lever after the cam has acted, substantially as described.

10. In a printing-press, the combination of an impression-cylinder, and mechanism for tripping said cylinder; with a lever adjacent to said mechanism having a cam adapted when the lever is in one position to modify the action of the tripping mechanism, means for shifting said lever into position to cause the cam to act, and a latch adapted to engage and hold said lever in such position when the lever-shifting means is released, substantially as described.

11. In a double-cylinder press, the combination of the cylinders, an independent tripping mechanism for each cylinder, a controlling device for each tripping mechanism, and means for shifting said controlling devices simultaneously into position to cause the effective operation of the respective tripping mechanisms, and means whereby the controlling device of the tripping mechanism for the second cylinder will be held in position upon the release of the shifting means until the second tripping mechanism has effectively acted, substantially as described.

12. In a double-cylinder press, the combination of the cylinders, independent tripping mechanisms for the respective cylinders, a controlling-lever for each tripping mechanism adapted to cause the effective operation thereof when in one position but prevent effective operation thereof in the other position; with means for shifting said controlling devices independently, and means for shifting them simultaneously into position to cause the effective operation of their respective tripping mechanisms, and means whereby the controlling device of the tripping mechanism for the second cylinder is held in position after the release of its shifting means until the second cylinder is properly tripped, all substantially as and for the purpose described.

ROBERT MIEHLE.

Witnesses:
H. M. MUNDAY,
L. C. CURTIS.